US010167240B1

(12) United States Patent
Merritt et al.

(10) Patent No.: US 10,167,240 B1
(45) Date of Patent: Jan. 1, 2019

(54) METHOD AND APPARATUS FOR SOLUBILIZING HUMIC ACID GRANULES

(71) Applicant: Humic Growth Solutions, Inc., Jacksonville, FL (US)

(72) Inventors: Kevin Merritt, Jacksonville, FL (US); Andrew Vincent Renyer, Sabetha, KS (US)

(73) Assignee: Humic Growth Solutions, Inc., Jacksonville, FL (US)

(*) Notice: Subject to any disclaimer, the term of this patent is extended or adjusted under 35 U.S.C. 154(b) by 0 days.

(21) Appl. No.: 14/948,480

(22) Filed: Nov. 23, 2015

Related U.S. Application Data

(60) Provisional application No. 62/084,864, filed on Nov. 26, 2014.

(51) Int. Cl.

| C05F 11/02 | (2006.01) |
|---|---|
| C05G 3/00 | (2006.01) |
| B01F 1/00 | (2006.01) |
| B01F 7/22 | (2006.01) |
| B01F 15/02 | (2006.01) |

(52) U.S. Cl.
CPC ............ *C05F 11/02* (2013.01); *B01F 1/0011* (2013.01); *B01F 7/22* (2013.01); *B01F 15/0222* (2013.01); *C05G 3/0076* (2013.01)

(58) Field of Classification Search
CPC .......... C05F 11/02; B01F 1/0011; B01F 7/22; B01F 15/0222; C05G 3/0076; C09K 17/14
See application file for complete search history.

(56) References Cited

U.S. PATENT DOCUMENTS

| 4,076,078 A * | 2/1978 | Drinkard ................. | E21B 43/24 166/266 |
|---|---|---|---|
| 5,034,045 A * | 7/1991 | Alexander .............. | C05F 11/02 71/24 |
| 5,135,561 A * | 8/1992 | Boles ........................ | C05C 3/00 71/28 |
| 5,290,554 A * | 3/1994 | Tolpa ....................... | C10G 1/04 424/762 |
| 2002/0174697 A1* | 11/2002 | Reid ....................... | C05B 17/00 71/23 |

* cited by examiner

*Primary Examiner* — Jennifer A Smith
(74) *Attorney, Agent, or Firm* — Hovey Williams LLP

(57) ABSTRACT

Improved methods and apparatus (10, 74) for the solubilization of initially solid humic acids include a large-volume mixing/agitation tank (12, 76) for water and solid humic acids, together a recirculation assembly (14, 78) for continuously recirculating the water/humic acids mixture while reducing the size of the humic acids. Properly used, the apparatus (10, 74) is capable of providing relatively stable, solubilized humic acid solutions or dispersions.

11 Claims, 7 Drawing Sheets

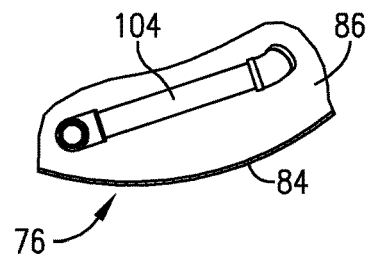
FIG. 9.
FIG. 7.
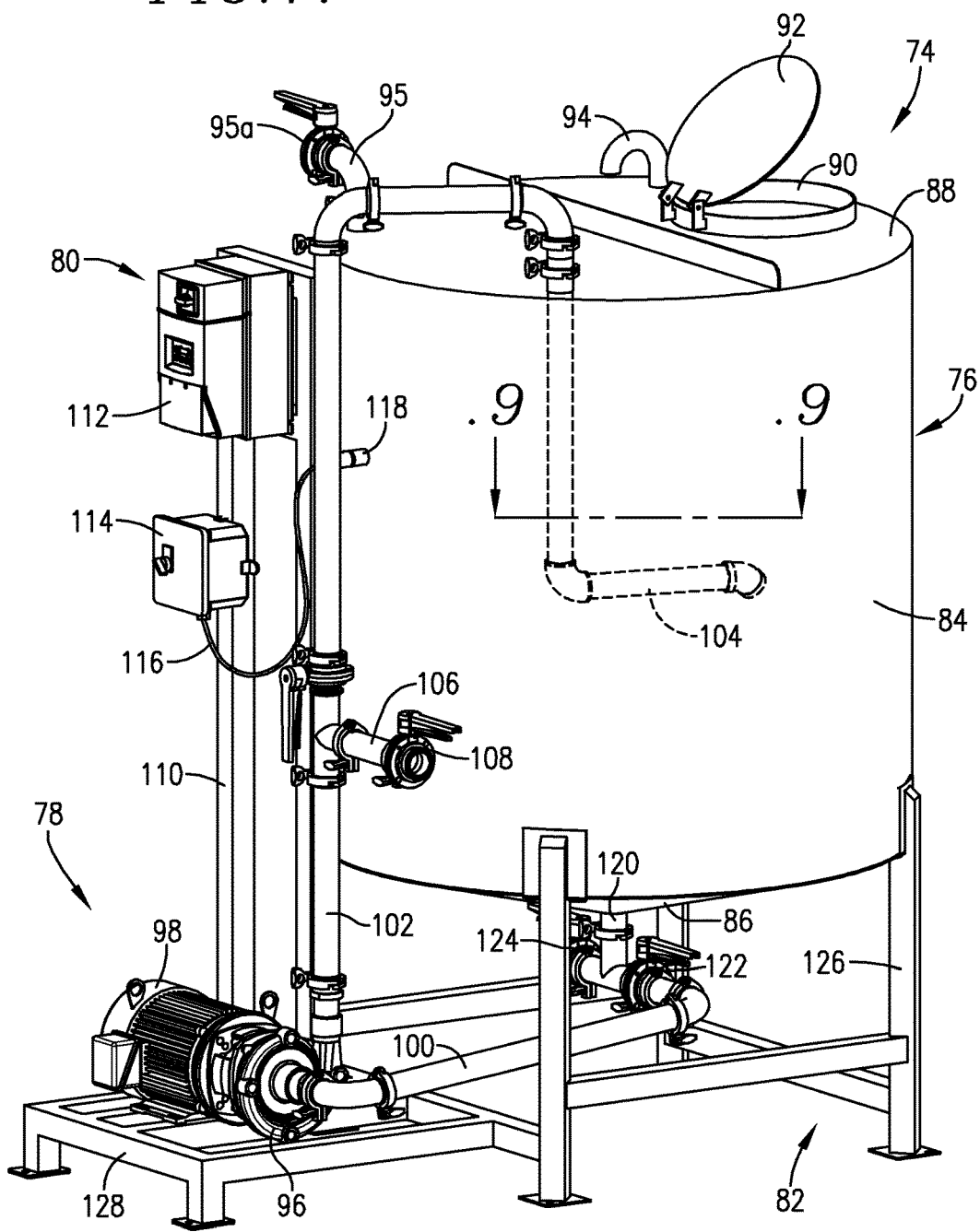

METHOD AND APPARATUS FOR SOLUBILIZING HUMIC ACID GRANULES

CROSS-REFERENCE TO RELATED APPLICATION

This application claims the benefit of U.S. Provisional Application Ser. 62/084,864, filed Nov. 26, 2014, which is incorporated herein by reference in its entirety.

BACKGROUND OF THE INVENTION

Field of the Invention

The present invention is broadly concerned with methods and apparatus for reconstituting solid humic acids as relatively stable aqueous dispersions suitable for field application without undue sedimentation of the humic acids. More particularly, the invention is concerned with such methods and apparatus wherein a relatively large capacity water/solid humic acids mixing tank is provided, and equipped with an internal agitation assembly and an external recirculation assembly. These system components are operated so as to assure rapid and effective solubilization of humic acids.

Description of the Prior Art

Humic acids have long been used by gardeners and farmers as fertilizers and soil amendments. These materials are naturally occurring and thus organic, and have a number of beneficial effects:
  Improves the uptake of nutrients
  Assists in soil remediation
  Improves root structure and development
  Increases microbial activity
  Boosts seed germination
  Increases yields
  Reduces fertilizer runoff
  Promotes healthier crops
  Improves water retention
  Increases antioxidant activity
  Stimulates plant enzymes
  Prevents disease and heat stress
  Enhances soil fertility.

Large-scale agricultural uses of humic acids generally require that the acids be delivered in solid form, typically either as powders or granules. If humic acids are sold as liquids in such contexts, shipping costs can be prohibitive. Nonetheless, it is often most convenient to apply humic acids in solubilized form using conventional agricultural spraying equipment. Accordingly, the ideal situation is that the humic acids be sold and shipped in solid form, and then solubilized on-site by a dealer or farmer prior to application thereof. Another requirement is that the resultant liquid be relatively stable, without undue sedimentation of the humic acids over extended storage periods.

In practice, it has been found that solubilization of such initially solid humic acids can be difficult and sometimes impossible to achieve. This is especially the case where relatively small volumes of solubilized product are required. There is accordingly a real and unsatisfied need in the art for improved methods and apparatus whereby initially solid humic acids may be quickly and efficiently solubilized to yield relatively stable final products.

SUMMARY OF THE INVENTION

The present invention overcomes the problems outlined above and provides apparatus for reconstituting and hydrating humic acid originally in solid form as aqueous, relatively stable solutions or dispersions; in certain embodiments, the resultant solutions or dispersions have humic acid solids with average sizes of less than about 400 microns. As used herein, "humic acids" is a general term which embraces a variety of specific acids including fulvic acids, which are generally lower molecular weight species of humic acids. Therefore, "humic acids" should be taken as a generic term encompassing all such acidic species.

The apparatus includes a water/solid humic acids tank having a liquid inlet and a liquid outlet, a solid humic acid inlet, a volume of at least about 300 gallons, and a frustoconical lower section with the liquid outlet being adjacent the bottom of the lower section. A recirculation assembly also forms a part of the apparatus and is operable to continuously withdraw the water/humic acid mixture from the tank liquid outlet and to recirculate the mixture to the liquid inlet. The recirculation assembly includes a pump equipped with an impeller and capable of moving the mixture at a rate of at least about 125 gallons per minute from the liquid outlet to the liquid inlet while reducing the size of the solid humic acid, and provides a mixture residence time of at least about 2 minutes within the tank during recirculation. The tank is also equipped with an internal agitation assembly operable to agitate the mixture; this assembly has an upright shaft and mixing elements secured to the shaft, and a drive operable to rotate the shaft at a rate of at least about 45 rpm.

The invention also provides methods of reconstituting humic acids comprising the steps of forming a mixture comprising water and solid humic acid in a tank having a liquid inlet and a liquid outlet, a volume of at least about 300 gallons, and a frustoconical lower section with the liquid outlet being adjacent the bottom of the lower section. The mixture is continuously recirculated from the liquid outlet and to the liquid inlet using a recirculation assembly having a pump equipped with an impeller and capable of recirculating the mixture at a rate of at least about 125 gallons per minute from the liquid outlet to the liquid inlet. Moreover, the recirculation assembly is designed to allow the mixture to reside within the tank for a residence time of at least about 2 minutes during the recirculation step. During recirculation, the mixture is also agitated within the tank using an agitation assembly including an upright shaft and mixing elements secured to the shaft, and rotating the shaft at a rate of at least about 45 rpm.

BRIEF DESCRIPTION OF THE DRAWINGS

FIG. 7 is a perspective view of another preferred apparatus useful in the invention;

FIG. 9 is a sectional view taken along line 9-9 of FIG. 7.

DETAILED DESCRIPTION OF THE PREFERRED EMBODIMENTS

Embodiment of FIGS. 1-6

Figure 1:
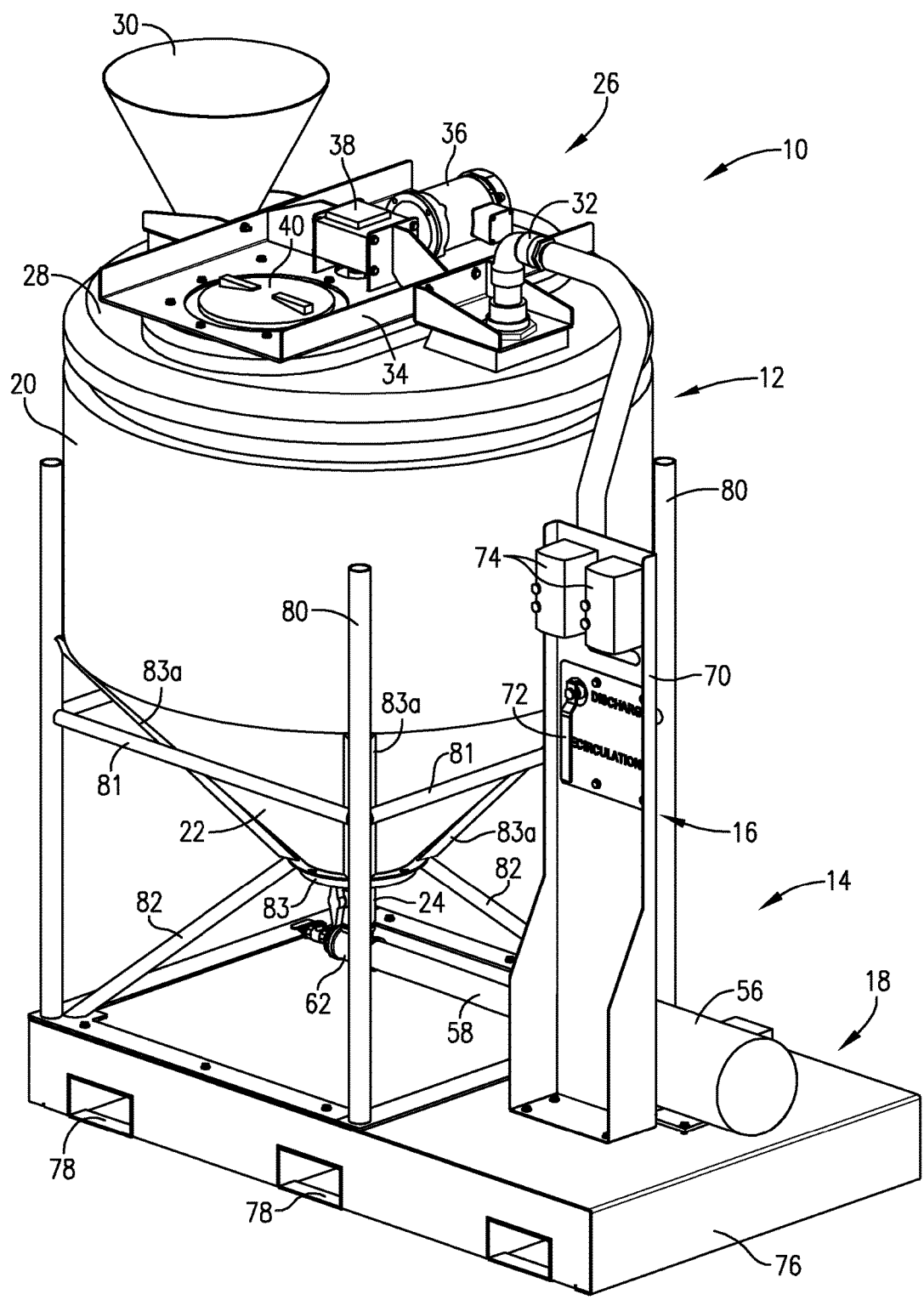
FIG. 1 is a perspective view of the preferred apparatus useful in the invention.

Turning now to the drawings, an apparatus 10 for reconstitution of solid humic acids as aqueous dispersions is illustrated in FIGS. 1-5 and broadly includes a mixing/agitation tank 12, a recirculation assembly 14, a control station 16, and support structure 18 for the aforementioned components. The apparatus 10 is designed to quickly and efficiently solubilize solid humic acids, typically in the form of granules and/or powders, to yield humic acid aqueous dispersions which are relatively stable and can be field-applied using conventional agricultural spraying equipment for fertilization and/or soil remediation purposes.

Figure 3:
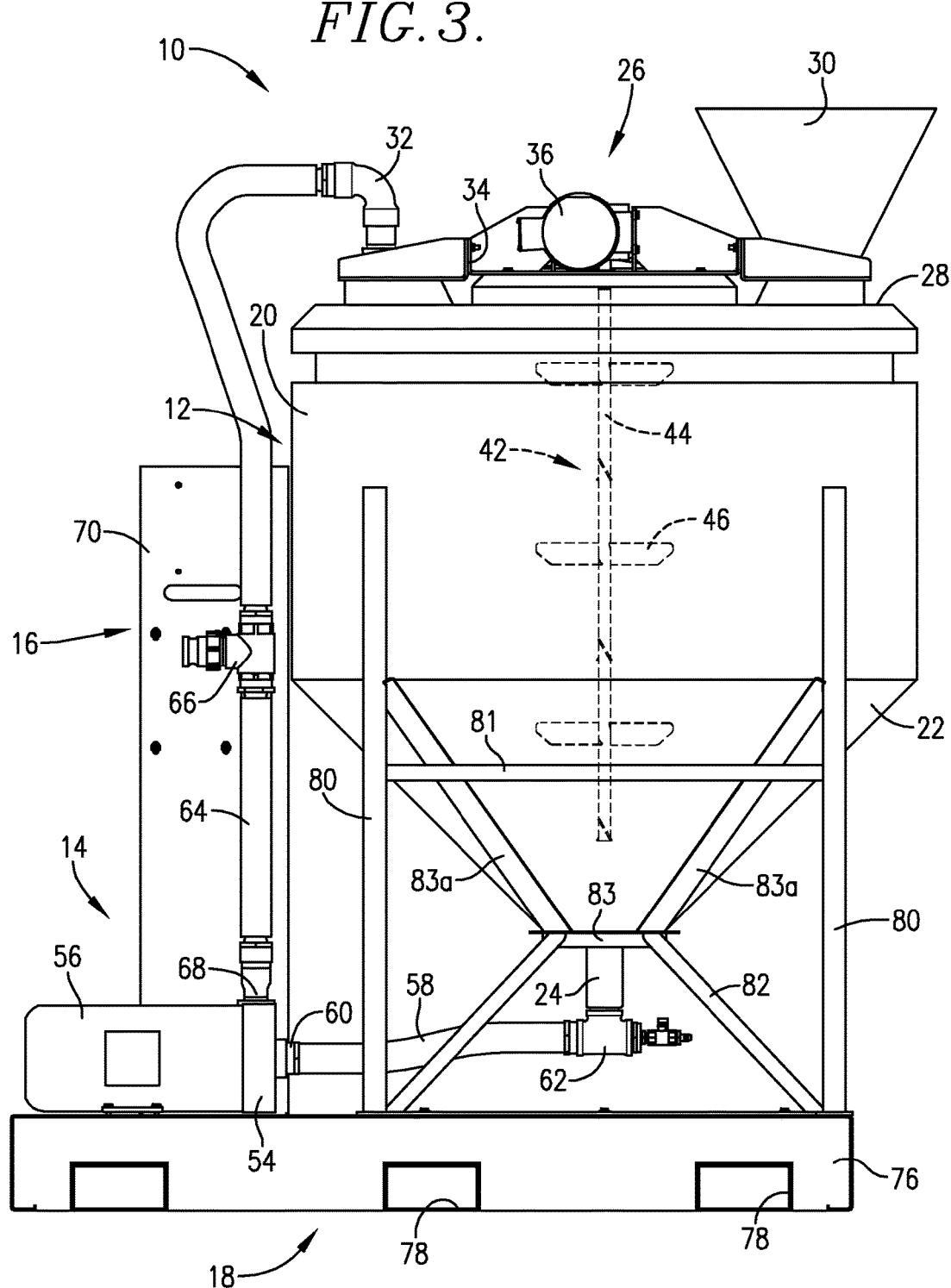
FIG. 3 is a side elevational view of the apparatus.
Figure 4:
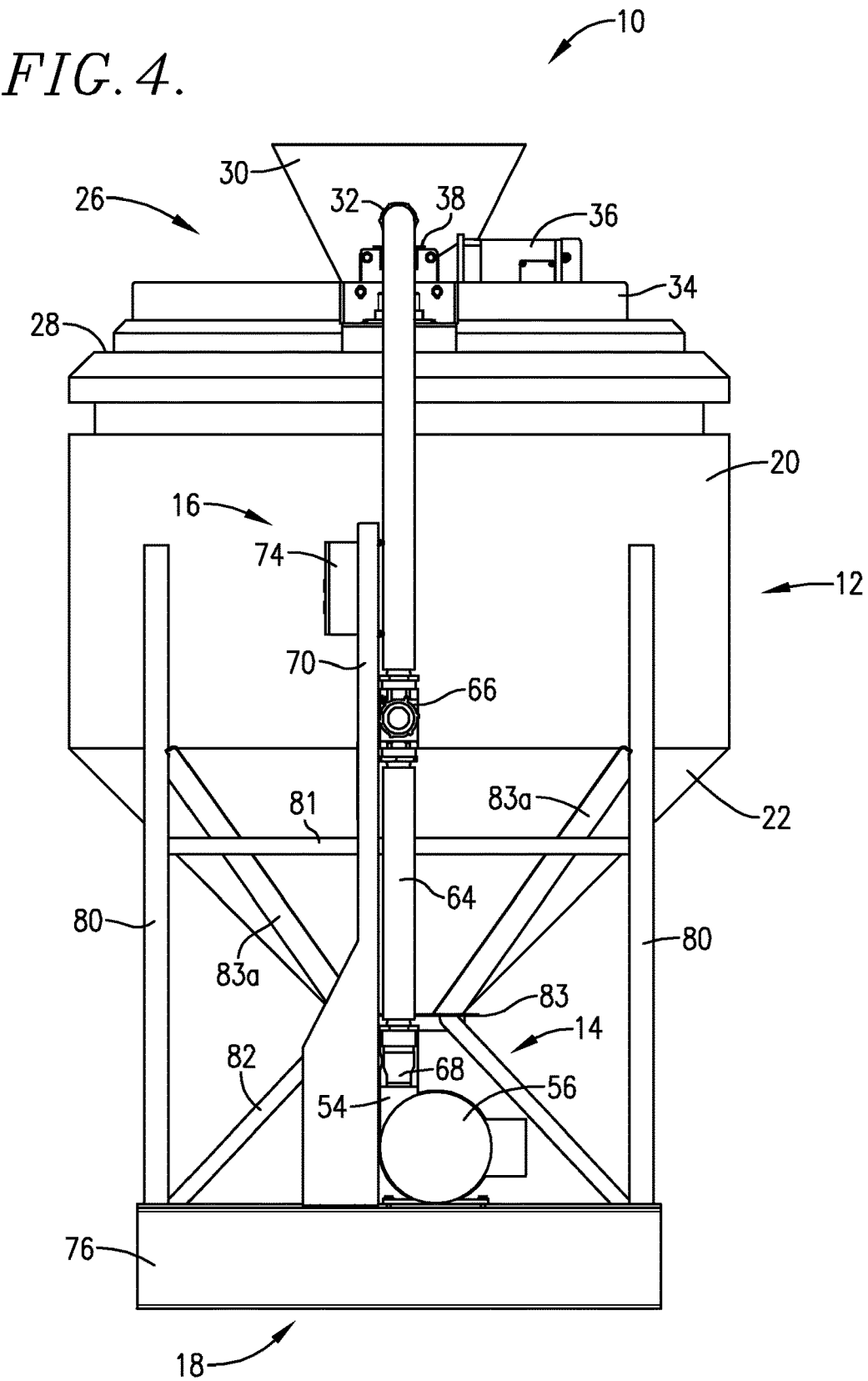
FIG. 4 is another side elevational view of the apparatus, illustrating the side opposite that shown in FIG. 3.
Figure 5:
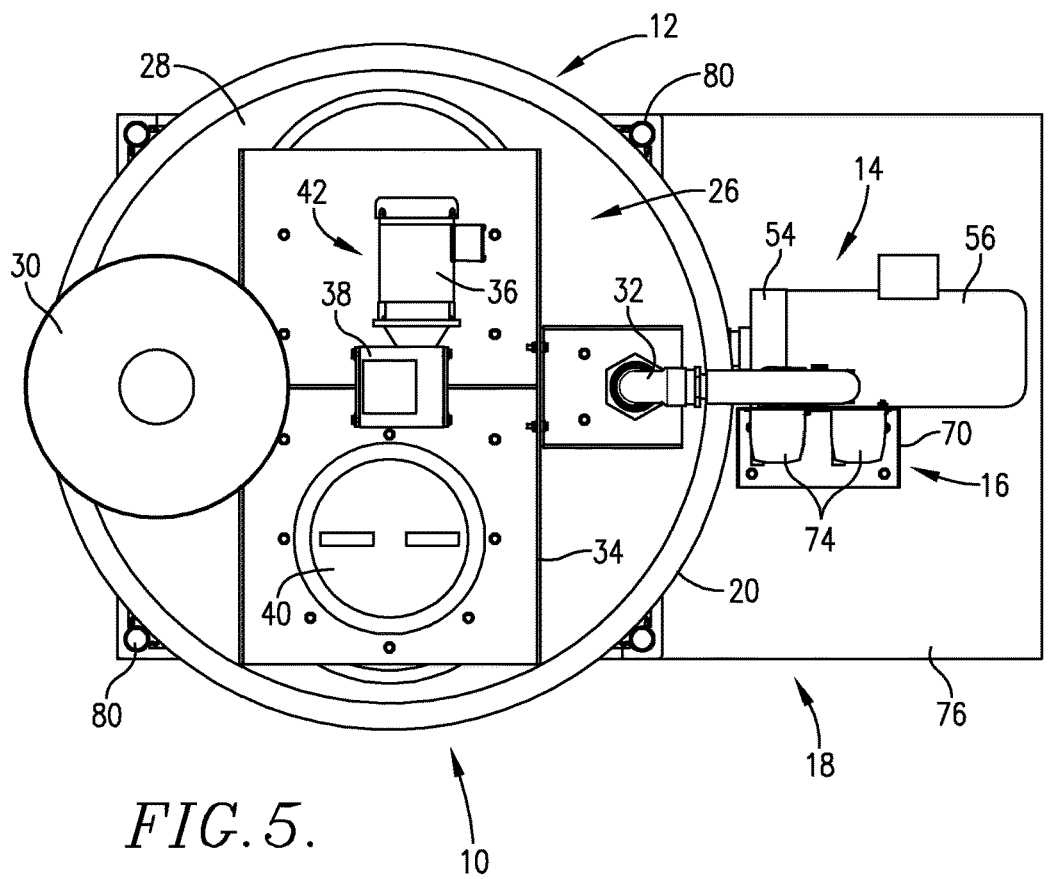
FIG. 5 is a plan view of the apparatus.
Figure 6:
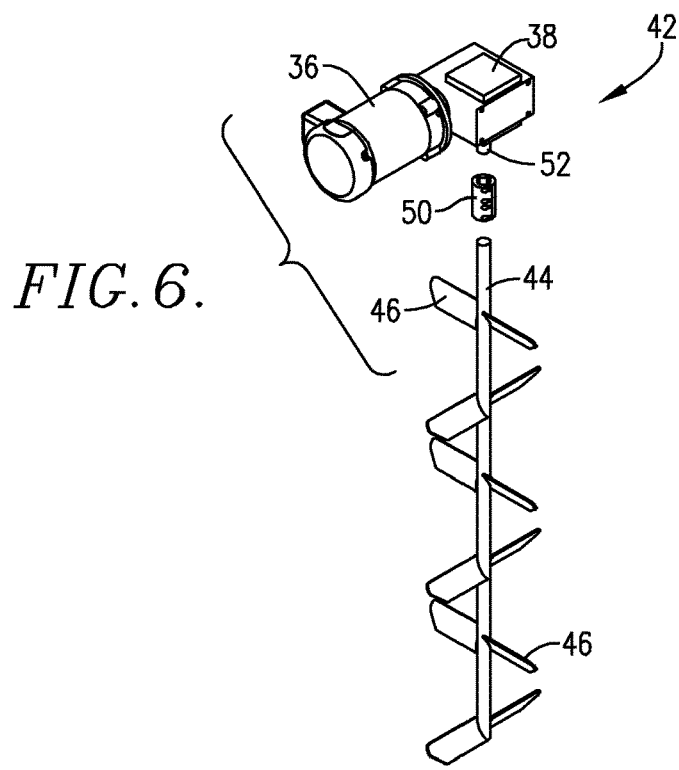
FIG. 6 is an exploded view depicting the components of the preferred agitation assembly forming a part of the overall apparatus.

In more detail, the tank 12 is formed of synthetic resin material, has a capacity of 345 gallons, and includes an upper cylindrical section 20 and a lower frustoconical section 22 terminating with a downwardly extending outlet valve 24. A top cover assembly 26 is positioned atop cylindrical section 20 and includes an apertured cover plate 28 supporting an infeed funnel 30, and a recirculation inlet fitting 32. The assembly 26 further includes a support channel 34 having an agitation drive motor 36 and gear box 38 with a one-inch output shaft, and a removable inspection lid 40 covering an inspection opening (not shown) through the cover assembly. Internally, the tank 12 is equipped with an agitation assembly 42 (see FIG. 6), which includes an elongated, upright shaft 44 and a plurality of outwardly extending blade-like mixing elements 46. Although the blades as shown are essentially flat and angularly oriented, such blades could also be provided with downwardly concave surfaces. The shaft 44 is connected via coupler 50 to the output shaft 52 of gear box 38. As best seen in FIG. 3, the shaft 44 is substantially centrally located within tank 12, extending from the connection with the output shaft of gear box 38 downwardly into proximity with outlet valve 24.

Figure 2:
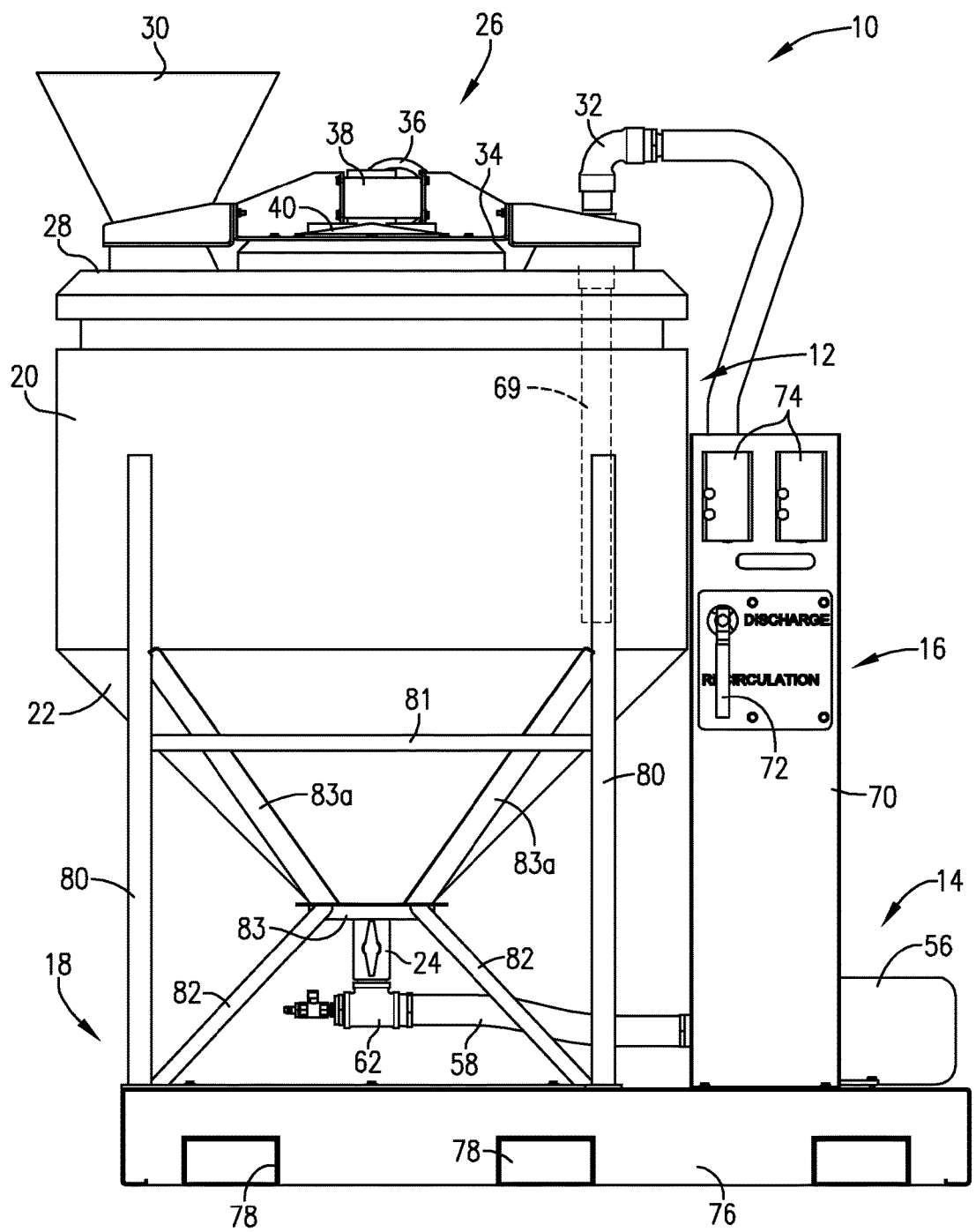
FIG. 2 is a front elevational view of the apparatus.

The recirculation assembly 14 includes a pump 54 having a cast iron centrifugal pump head and an internal metallic impeller blade (not shown) powered by means of drive motor 56. An elongated, two-inch, reinforced conduit hose 58 is secured to the inlet 60 of pump 54 and to a tee connector 62. The valve 24 is a full-port, three-way, two-inch ball valve, and is secured to the frustoconical section 22 of tank 12. Additionally, the assembly 14 includes an upwardly extending output conduit 64 having an intermediate two-way valve unit 66. The lower end of conduit 64 is secured to the output 68 of pump 54 and to the recirculation inlet fitting 32 supported by cover assembly 26. Finally, a delivery tube 69 is secured to fitting 32 and extends downwardly into the confines of tank 12 (FIG. 2).

The control station 16 includes an upstanding channel 70, which supports a rotatable operating handle 72 as well as push-button electronic controls 74. The handle 72 is operably connected with the valve unit 66 in order to permit manual operation thereof between recirculation and discharge positions, whereas the controls 74 are electrically connected to conventional sensors forming a part of apparatus 10.

The support structure 18 includes a lowermost metallic base 76 equipped with forklift tongue openings 78. A series of upright support posts 80 extend upwardly from base 76 with lateral reinforcing elements 81 interconnecting the posts. Four oblique struts 82 also extend upwardly from the base 76 and are secured to a collar 83. The collar 83 is equipped with four obliquely upwardly extending tank supports 83a. In this fashion, the support structure 18 presents a cradle designed to removably support the tank 12. As also shown, the base 76 supports channel 70, pump 54, and motor 56. In this fashion, the entire apparatus 10 is portable and can be moved within a plant as needed in order to mix and solubilize solid humic acids.

In the operation of apparatus 10, water and solid humic acids are delivered to tank 12 via funnel 30, and motor 36 is energized to rotate the shaft 44, thereby agitating the humic acid/water mixture within the tank. After a suitable period of mixing, the recirculation assembly 14 is actuated by energizing pump motor 56 and opening the valve unit 66 to the "recirculation" position. This causes the humic acid/water mixture within tank 12 to be drawn through hose 58, pump 54, and conduit 64, so that the mixture is ultimately delivered through the tube 69 within the confines of the tank. These agitation and recirculation operations are continued until the initially solid humic acids are substantially solubilized. At this point, during continued operation of the recirculation assembly 14, the operating handle 72 is moved to the "discharge" position, whereby the solubilized humic acids are delivered via an output conduit (not shown) operably coupled with the remaining end of valve unit 66.

In the development of the invention, it has been found that, in order to efficiently solubilize humic acids and create stable dispersions, at least some important parameters outlined below should be employed in the use of apparatus 10. Otherwise, humic acid solubilizations proceed at unacceptably slow rates and/or the humic acids never become satisfactorily solubilized.

For example, these parameters include the volumetric size of the tank 12, which should be at least about 300 gallons, and more preferably from about 325-375 gallons. The recirculation pump 54 advantageously has a stainless steel impeller, which is operable to handle and break down the solid humic acids as they pass through the pump. The pump is rated at least about 125 gallons per minute, and more preferably from about 150-210 gallons per minute. The recirculation apparatus 14 is preferably operated so that the mixture within tank 12 has a residence time of at least about two minutes, more preferably about 2.3 minutes. The agitation assembly 42 is preferably operated at a rate of at least about 45 rpm, and more preferably from about 50-65 rpm. The mixing elements 40 serve to submerge and agitate the solid humic acids to thereby facilitate solubilization thereof. The presence of the discharge tube 69, having its lowermost outlet end below the level of liquid within the tank 12, prevents foaming of the mixture which may be occur if the recirculating mixture were simply added to the top of the liquid within the tank. As noted, the conduit 58 is reinforced so as to prevent collapse thereof owing to the suction of pump 54. It is to be understood that not all of these parameters in combination need be used to achieve satisfactory results, but at least some of them should be employed for best results.

Proper use of apparatus 10 yields relatively stable solubilized humic acid solutions or dispersions which resist undue sedimentation for at least about three days, and more preferably at least about one week; as used herein "undue sedimentation" refers to more than about 10% by weight of the humic acid content of the products collecting as sediment within a container for the solutions or dispersions.

Figure 8:
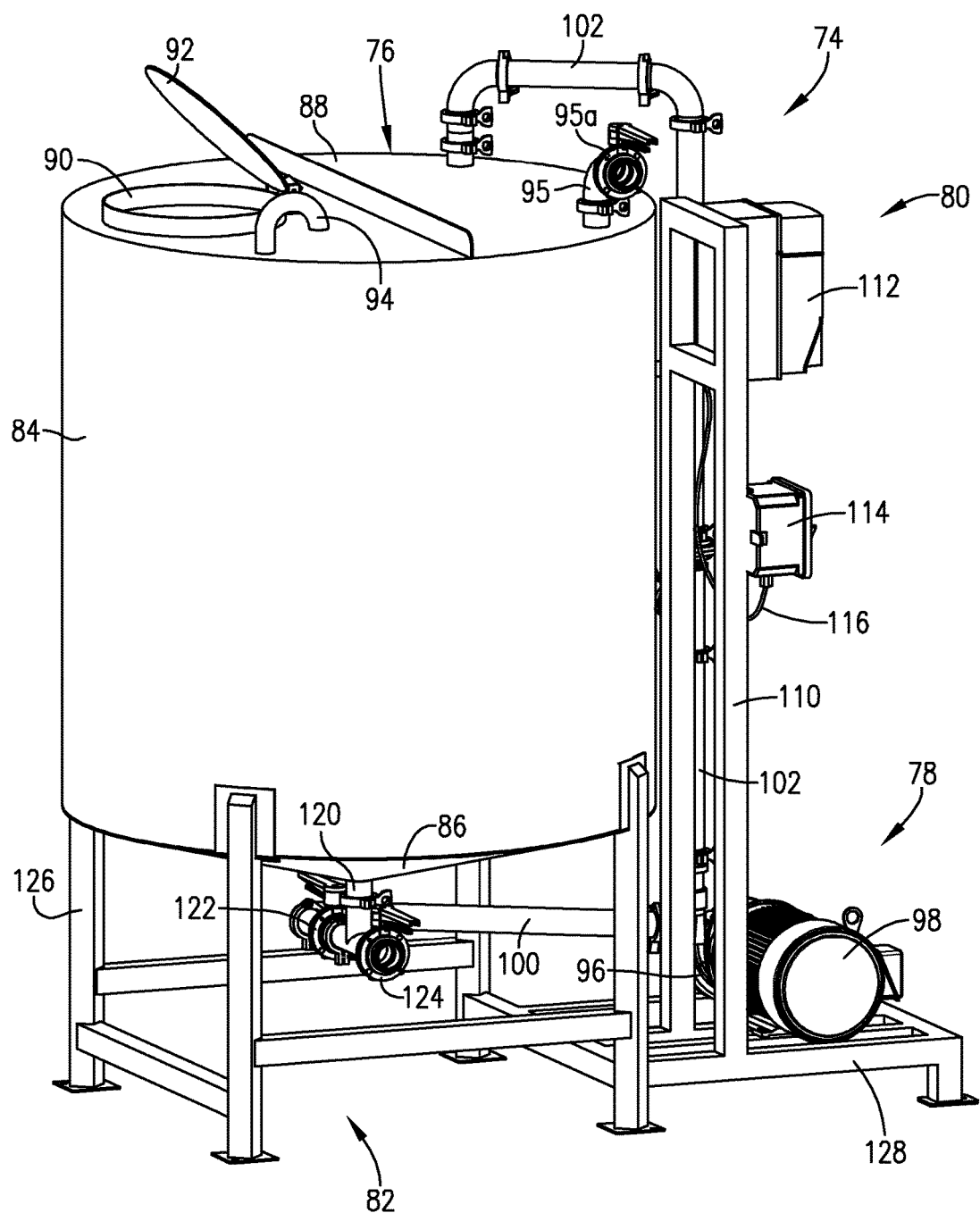
FIG. 8 is another perspective view of the FIG. 7 apparatus, viewing from the opposite side thereof illustrated in FIG. 7.

Embodiment of FIGS. 7-9

FIGS. 7-8 illustrate another suitable apparatus 74 for carrying out the invention, which broadly includes a mixing tank 76, a recirculation assembly 78, a control station 80, and support structure 82. The tank 76 may be formed of any suitable material, such as metal or synthetic resin, and includes an upper cylindrical section 84 and a lower frustoconical section 86. The tank is also equipped with a tank top cover 88 including a port 90 having a hinged cover 92, a U-shaped vent 94, and an inlet elbow 95 equipped with valve 95a.

The recirculation assembly 78 includes a centrifugal pump 96 coupled to a motor 98. An inlet conduit 100 is operably coupled to the pump inlet, whereas an outlet conduit 102 extends upwardly from the pump outlet and extends through tank top cover 88, terminating in a horizontal delivery pipe 104 within the confines of tank 76. The conduit 102 includes an intermediate stub pipe 106 having a valve 108.

The control station 80 includes an upright standard 110 supporting a programmable digital control box 112 and a sensor module 114, the latter having a lead 116 attached to a level sensor 118 which passes through tank section 84 to communicate with the interior of tank 76.

The bottom frustoconical section 86 of tank 76 has a central vertically extending outlet tee 120. One leg of the tee 120 includes a valve 122 coupled with the end of conduit 100, whereas the other tee leg has a valve 124 that may be used to empty the contents of tank 76 without the need for operation of pump 96.

The support structure 82 includes four upright legs 126 as well as a motor/pump stand 128, the latter also supporting standard 110.

Operation of the apparatus 74 involves continuous recirculation of water and humic acids through tee 120, conduit 100, pump 96, conduit 102, and outlet pipe 104 until the desired degree of humic acid solubilization has been achieved. Advantageously, use of the apparatus 74 involves filling the tank 76 with water to a level indicated by sensor 118, followed by operation of pump 96 to recirculate the water. Then, an appropriate quantity of humic acid solids are introduced into the tank 76 via port 90 and allowed to recirculate with the water for a period of time to hydrate the solids. Additional quantities of humic acid solids are then added over time, with increasing pump speeds to achieve the desired fully hydrated and solubilized, smooth, and lump-free product.

The apparatus 74 has the same preferred parameters described in connection with the embodiment of FIGS. 1-6, including the tank size, pump design and throughput rates, and residence time within the tank. However, it has been found that the embodiment of FIGS. 7-9 does not require a separate agitation assembly. Notwithstanding the absence of an agitation assembly, the apparatus 74 is capable of producing the stable solubilized humic acid solutions or dispersions described previously.

We claim:

1. A method of reconstituting humic acid in solid form as an aqueous solution, comprising the steps of:
   forming a mixture comprising water and naturally occurring, solid humic acid in a fixed-dimension tank having inlet structure and an outlet, a fixed volume of at least about 300 gallons, and a lower section with said outlet being adjacent the bottom of the lower section,
   said mixture-forming step comprising the steps of introducing solid, naturally occurring humic acid in the form of granules and/or powders through said inlet structure and into the confines of said tank, and also introducing water through the inlet structure into the confines of said tank;
   forming said aqueous solution by continuously recirculating said mixture from said outlet and to said inlet structure using a recirculation assembly, and agitating said mixture using a motor-driven mixing shaft extending into the confines of the tank, said recirculation assembly including a pump equipped with an impeller and capable of recirculating said mixture at a rate of at least about 125 gallons per minute from said outlet to said inlet structure, and
   allowing said mixture to reside within said tank for a residence time of at least about 2 minutes during said recirculation step; and
   recovering a solution of humic acid which resists undue sedimentation for at least about 3 days.

2. The method of claim 1, said pump rate being about 150 gallons per minute.

3. The method of claim 1, said residence time being 2.3 minutes.

4. The method of claim 1, said volume being about 345 gallons.

5. The method of claim 1, including the step of discharging said mixture within said tank at a point so that said mixture is discharged below the level of liquid within the tank.

6. The method of claim 1, including the step of recirculating said mixture from said tank outlet to the inlet of said pump using a reinforced conduit which prevents contraction of the conduit during operation of the apparatus.

7. The method of claim 1, including the step of rotating said shaft at a rate of at least about 45 rpm.

8. The method of claim 1, said solution having humic acid solids with an average size of less than about 400 microns.

9. The method of claim 1, said aqueous solution exhibiting no more than about 10% by weight sedimentation of the humic acid content of the dispersion for at least about one week.

10. The method of claim 1, said mixture consisting essentially of water and naturally occurring solid humic acid.

11. The method of claim 1, said inlet structure including separate inlets for said solid humic acid and water, respectively.

* * * * *